United States Patent
Madina

[19]

[11] Patent Number: 5,875,344
[45] Date of Patent: Feb. 23, 1999

[54] USING A FILE ENABLER WITH FIRMWARE

[75] Inventor: Shab H. Madina, Houston, Tex.

[73] Assignee: Compaq Computer Corporation, Houston, Tex.

[21] Appl. No.: 680,600

[22] Filed: Jul. 16, 1996

[51] Int. Cl.$^6$ .................................................. G06F 1/30
[52] U.S. Cl. ................... 395/750.01; 395/182.22
[58] Field of Search ................ 395/182.13, 182.22, 395/750.05, 750.08, 750.01, 616, 621

[56] References Cited

U.S. PATENT DOCUMENTS

| | | | |
|---|---|---|---|
| 5,371,885 | 12/1994 | Letwin | 395/621 |
| 5,530,877 | 6/1996 | Hanaoka | 395/750.01 |
| 5,539,885 | 7/1996 | Ono et al. | 395/200.33 |
| 5,548,763 | 8/1996 | Combs et al. | 395/750.05 |

OTHER PUBLICATIONS

IBM Technical Disclosure Bulletin, vol. 38 No. 5, May 1995, "Operating System and Machine Independent Hibernation", pp. 143–144.

*Primary Examiner*—Glenn A. Auve
*Attorney, Agent, or Firm*—Fish & Richardson, P.C.

[57] ABSTRACT

A computer system has a mass storage device storing a file enabler associated with a file system for enabling file operations, a firmware memory storing a firmware routine, and a second memory. The computer system also has a microprocessor connected to load the file enabler stored on the mass storage device into the second memory and allow the firmware routine to access the file enabler stored in the second memory in file operations. The computer system may be a portable computer, and the firmware routine may be a hibernation routine.

49 Claims, 6 Drawing Sheets

USING A FILE ENABLER WITH FIRMWARE

BACKGROUND

The invention relates to using firmware.

A typical portable computer has a battery for furnishing power to the computer when AC power is unavailable. When the battery becomes substantially discharged, a user of the computer may not have sufficient time to save data before the complete discharge of the battery and corresponding shut down of the computer.

The portable computer may have firmware to prevent data loss due to power failure, such as a hibernation routine incorporated into a Basic Input/Output System (BIOS). The BIOS is located in a Read Only Memory (ROM) of the computer and contains systems programs for interfacing higher level software, such as an operating system (e.g., MS-DOS), to hardware of the computer. The hibernation routine is executed by a central processing unit (CPU) of the computer when circuitry of the computer detects the battery has become almost discharged. The hibernation routine transfers the contents of a system memory and the states of computer devices, i.e., hibernation data (which would be lost when power is shut down) to a disk drive (where they can survive when power is lost) of the computer before the complete discharge of the battery. When power is restored to the computer, the hibernation routine restores the contents of the system memory and the states of the computer devices that existed prior to the hibernation.

The hibernation routine may store the hibernation data to the disk drive as a file pursuant to a file system (e.g., a file allocation table (FAT) system), or the hibernation routine may store the hibernation data to a reserved hibernation data partition of the disk drive which is not organized in accordance with a particular file system.

SUMMARY

In general, in one aspect, the invention features a method for aiding the execution of a firmware routine in a computer system. The method includes loading a file enabler stored on a mass storage device. The file enabler is associated with a file system for enabling file operations. The method also includes storing the file enabler in a memory and allowing the firmware routine to access the file enabler stored in the memory in connection with file operations.

Implementation of the invention may include one or more of the following features. The file operations may include accessing files on the mass storage device (e.g., a disk drive). The firmware routine may be a hibernation routine, and the firmware routine may copy hibernation data from the memory to the mass storage device using the file enabler. The firmware routine may also copy the hibernation data from the mass storage device to the memory using the file enabler. The method may also include storing at least two file enablers on the mass storage device, the file enablers being associated respectively with different file systems for enabling file operations on the mass storage device. The method may include identifying a file system (e.g., a FAT, NTFS, or HPFS file system) used by the computer system to access files on the mass storage device. The firmware routine may be one which does not have access to operating system code stored in the memory.

In general, in another aspect, the invention features a method for aiding the use of a firmware routine in a computer system having a mass storage device which stores files in accordance with any of a number of file systems. The method includes determining, among the number of file systems, the file system according to which the files are being stored and allowing the firmware routine to perform a file operation on the mass storage device in accordance with the file system under which the files are being stored.

Implementation of the invention may include one or more of the following features. The allowing may include loading a file enabler from the mass storage device into a memory of the computer system, the file enabler being associated with the file system according to which the files are stored for enabling file operations. The file enabler may be stored in a partition (e.g., a preexisting diagnostics partition) on the mass storage device separate from a partition in which the files are stored.

In general, in another aspect, the invention features a computer system having a mass storage device storing a file enabler associated with a file system for enabling file operations, a firmware memory storing a firmware routine, and a second memory. The computer system has a microprocessor connected to load the file enabler stored on the mass storage device into the second memory and allow the firmware routine to access the file enabler stored in the second memory in file operations.

In general, in another aspect the invention features a computer system having a mass storage device which stores files in accordance with any of a number of file systems and a firmware memory storing a firmware routine. The computer system has a microprocessor connected to determine, among the number of file systems, the file system according to which the files are being stored and allow the firmware routine to perform a file operation on the mass storage device in accordance with the file system under which the files are being stored.

Among the advantages of the invention may be one or more of the following. Storing the file system enablers on the disk drive conserves valuable space inside the system read only memory (ROM) and allows expansion for new file systems. A reserved partition on the disk drive for the hibernation data is not required, as the hibernation routine can store the hibernation data as a file pursuant to the file system installed on the computer. The hibernation routine is not limited to any particular file system. The file system enablers can be stored in a preexisting diagnostics partition of the disk drive, and the file system enablers can be distributed on a floppy disk.

Other advantages and features will become apparent from the following description and from the claims.

DETAILED DESCRIPTION OF PREFERRED EMBODIMENTS

Figure 1A:
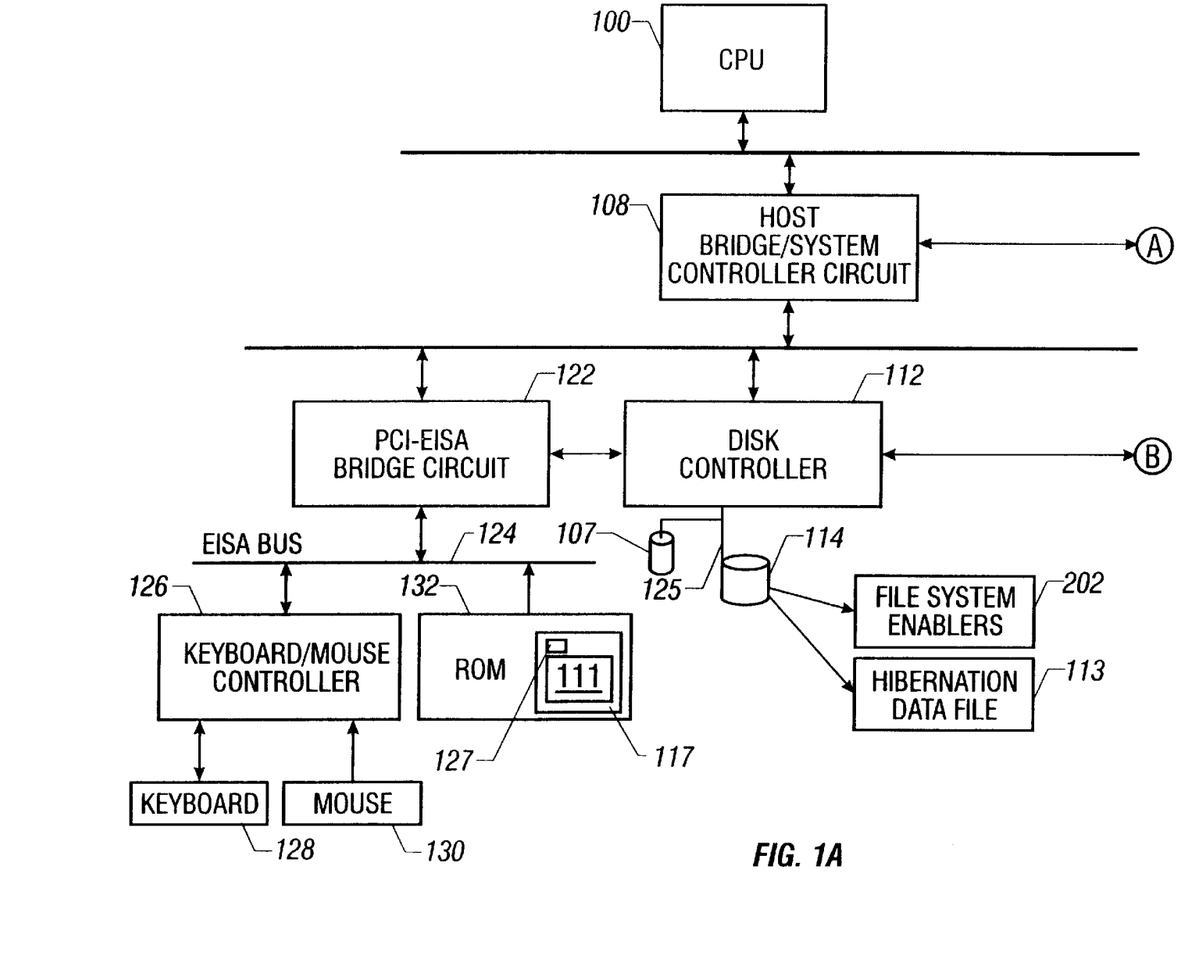
FIGS. 1A and 1B are block diagrams showing a computer system.
Figure 1B:
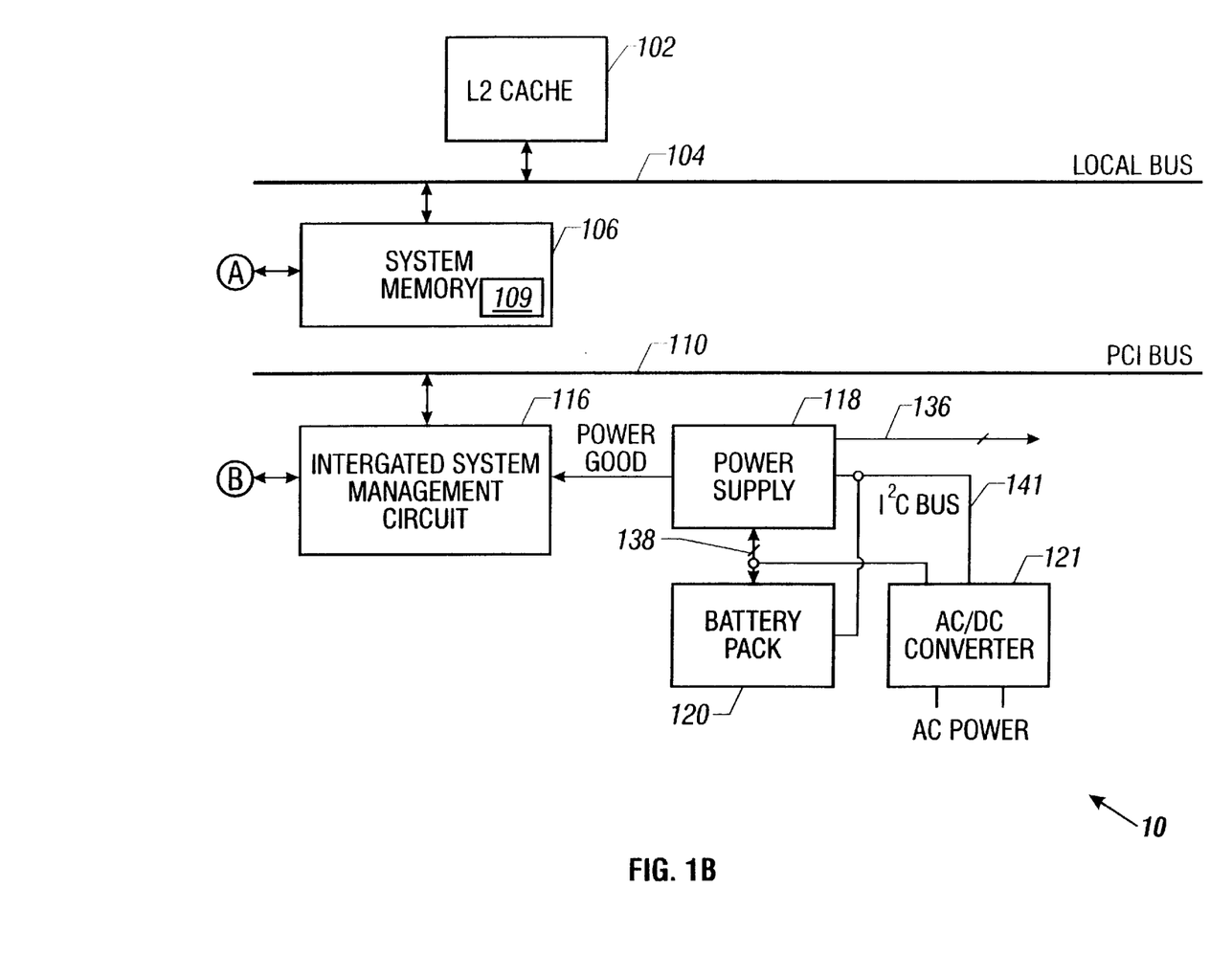

As shown in FIGS. 1A and 1B, file system enablers 202 stored on a hard disk drive 114 of a portable computer system 10 provide support under multiple file systems for a hibernation routine 111 which copies hibernation data (i.e., the contents of a system memory 106 and states of computer devices) onto the disk drive 114 as a hibernation data file 113. The states of the computer devices might include, for example, a state of a central processing unit (CPU) 100. Because the data of the file 113 is stored along with other files on the disk drive 114, no special reserved hibernation partition is required on the disk drive 114.

The portable computer system 10 includes the CPU 100, a level two (L2) cache 102, a host bridge/system controller 108 and a system memory 106, all of which are coupled to a local bus 104. The host bridge/system controller 108 controls access to the system memory 106 and interfaces the local bus 104 to a Peripheral Component Interconnect (PCI) bus 110. A PCI-Extended Industry Standard Architecture (EISA) bridge circuit 122, a disk controller 112 and an integrated system management circuit 116 are all coupled to the PCI bus 110. The disk controller 112 interfaces the PCI bus 110 to a SCSI bus 125 that is coupled to the hard disk drive 114 and a floppy disk drive 107. The disk controller 112 could alternatively be coupled to an EISA bus 124 instead of the PCI bus 110. The PCI-EISA bridge circuit 122 interfaces the PCI bus 110 to the EISA bus 124 which is coupled to a keyboard/mouse controller 126 and a Read Only Memory (ROM) 132. A keyboard 128 and a mouse 130 are coupled to the controller 126.

For purposes of determining when to invoke the hibernation routine 111, the integrated system management circuit 116 receives a powergood signal PWRGOOD from a power supply 118. The powergood signal PWRGOOD is asserted, or driven high, when the power supply 118 is furnishing at least a minimum level of power for the computer system 10 through power lines 136 of the power supply 118. The powergood signal POWERGOOD is deasserted, or driven low, when the power supplied by the power supply 118 is not adequate to sustain operation of the computer system 10. When AC power is unavailable, the power supply 118 receives power from a battery pack 120 via input terminals 138. When AC power is available, the power supply 118 receives power from an AC/DC converter 121 via the input terminals 138. The AC/DC converter, power supply 118 and battery pack 120 communicate via an I²C bus 141.

When AC power is unavailable and when the battery pack 120 approaches discharge, as indicated by the terminal voltage level of the battery 120 dropping below a threshold voltage level, the power supply 118 detects this occurrence and deasserts the power good signal PWRGOOD. When the power good signal PWRGOOD is deasserted, the integrated system management circuit 116 asserts an interrupt request to the CPU 100. The CPU 100 then executes the hibernation routine 111 which stores the hibernation data 115 on the disk drive 114 as the hibernation data file 113. The initiation of the hibernation routine 111 can also be done manually (e.g., the depression of a push button).

Figure 2:
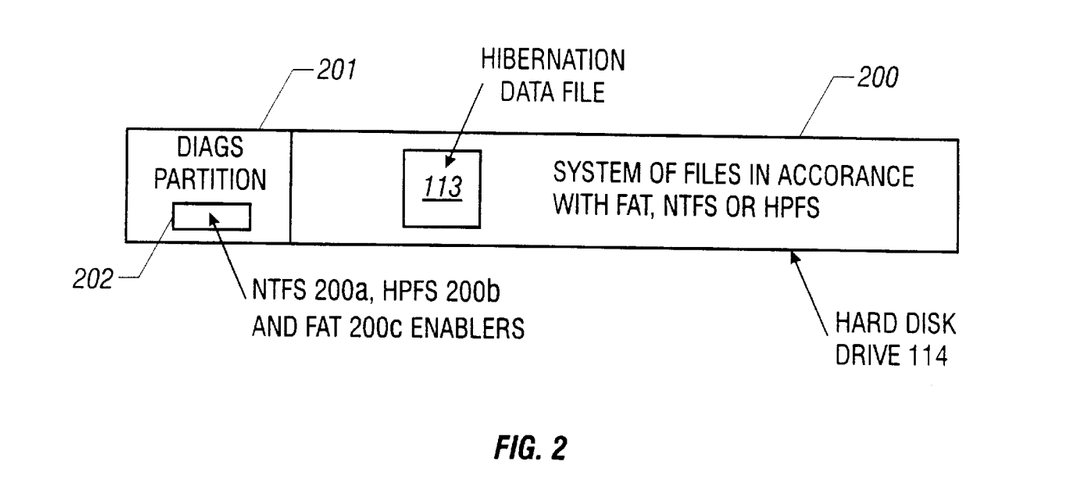
FIG. 2 is a schematic diagram showing a hard disk drive of the computer system of FIG. 1.

As seen also in FIG. 2, once the hibernation routine 111 is invoked, it is aided by the file enablers 202, which are algorithms that enable the hibernation routine 111 (stored in a ROM 132 as part of a Basic Input/Output System (BIOS) 117 of the computer system 10) to copy the hibernation data as the hibernation data file 113. Each of the enablers 202 allows this to be done in accordance with the protocol of a corresponding file system under which files on the disk drive 114 are organized. The file system enablers 202 include a New Technology File System (NTFS) enabler 202a, a High Performance File System (HPFS) enabler 202b, and a File Allocation System (FAT) enabler 202c.

As is typical with other BIOS 117 routines, the hibernation routine 111 cannot access the file system enablers that are used by a higher level operating system (e.g., MS-DOS) of the computer system 10 during normal operation of the computer system 10.

Instead, the hibernation routine 111 uses a copy 109, stored in the system memory 106, of the one of the file system enablers 202 corresponding to the file system installed and used by the computer system 10. The copy 109 is made from a preexisting diagnostics partition 201 of the disk drive 114 where all three enablers 202 are stored. Files on the disk drive 114 are located in a separate partition 200.

The copy 109 allows the hibernation routine 111 to store and to transfer the hibernation data to and from the disk drive 114 under the file system in which files on the drive 114 are organized. The identity of that file system is determined at power up of the computer system 10 by another BIOS routine called BOOT 127, which loads the copy 109 and stores the copy 109 in the system memory 106 for use by the hibernation routine 111. This is done as follows.

Figure 3:
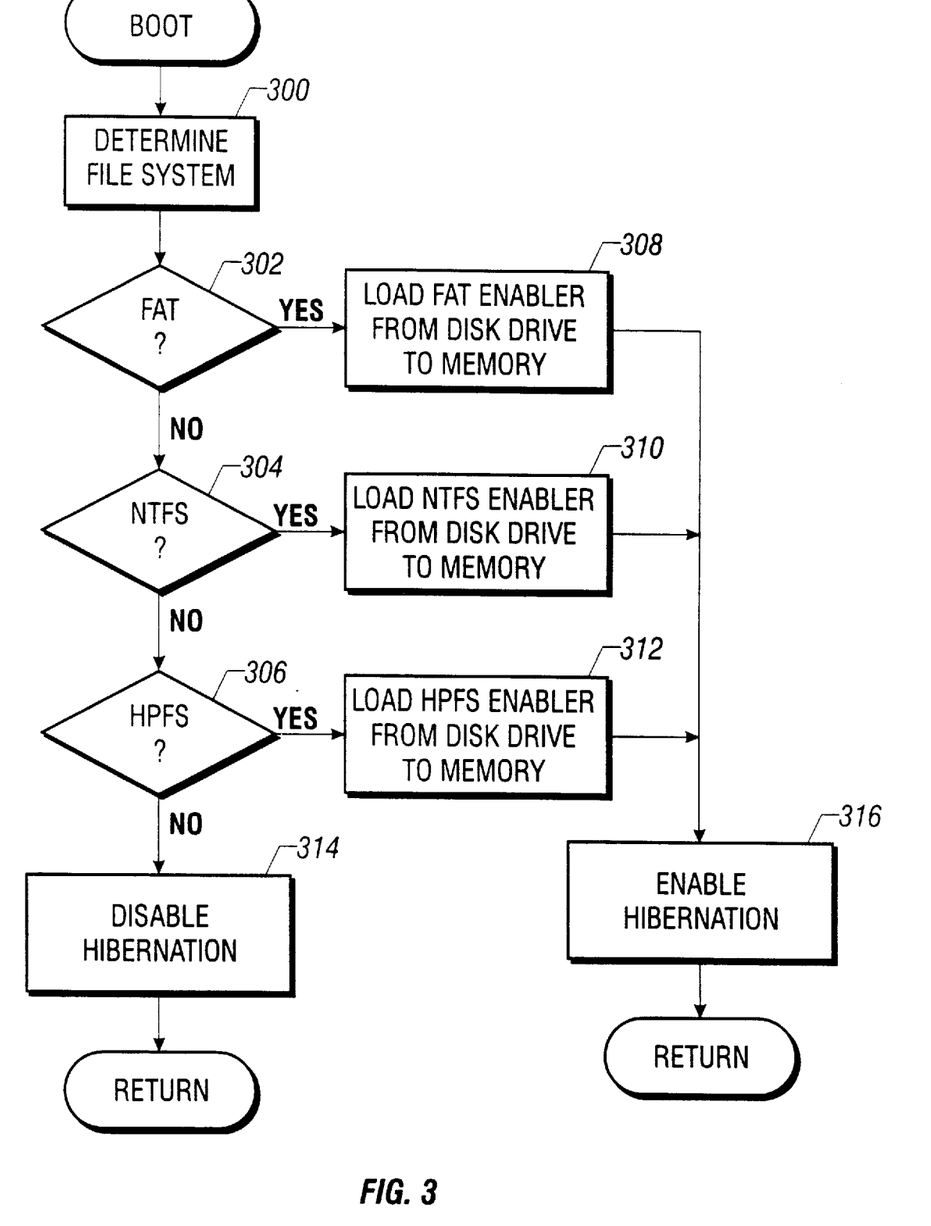
FIG. 3 is a flow diagram illustrating a routine to load file system enablers.

As shown in FIG. 3, after the initial boot up of the computer system 10, the BOOT routine 127 is executed to load the copy 109 of one of the file system enablers 202 from the disk drive 114 to the system memory 106. The CPU 100 first determines 300 which file system has been installed on the computer system 10 and is being used by the operating system to store files on the disk drive 114. The CPU 100 then determines 302–306 whether the FAT, the NTFS, or the HPFS file system is being used. The CPU 100 then loads 308–312 the corresponding one of the file system enablers 200a–c from the disk drive 114 and stores the copy 109 in the system memory 106. If the file system is unrecognized, the CPU 100 disables 314 the hibernation routine 111. Otherwise, the CPU 100 enables 316 the hibernation routine 111.

The routine BOOT may include additional steps to load additional file system enablers other than the FAT, NTFS or HPFS file system enablers 202 for other known and future file systems. Storing the file system enablers 202 on the disk drive 114 conserves valuable space inside the ROM 132, allows expansion for new file systems, and furnishes support for multiple file systems not typically available because the hibernation routine 111 is part of the BIOS 117.

Figure 6:
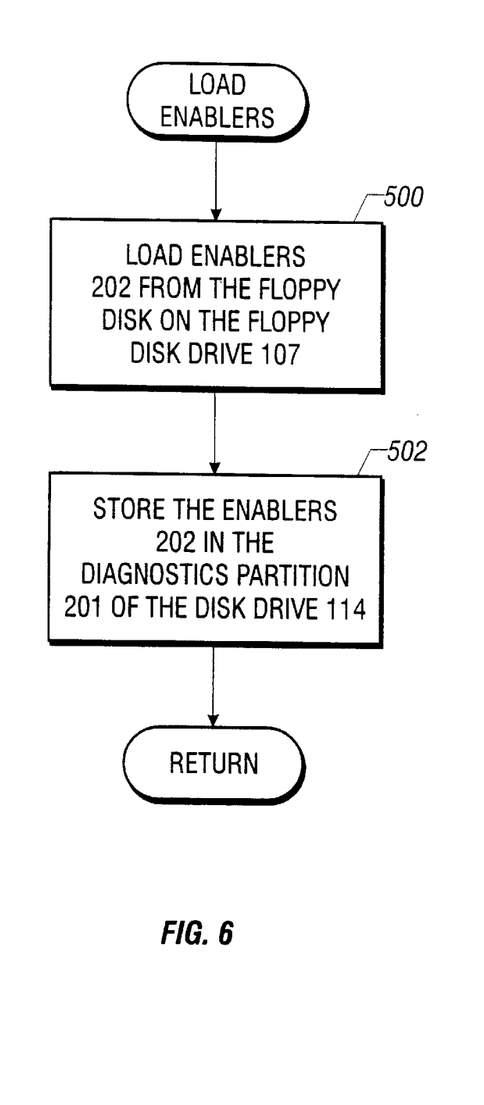
FIG. 6 is a flow diagram illustrating a routine to install the file system enablers.

The file enablers 202 may be transferred to the hard drive 114 from a floppy disk (not shown) inserted into the floppy drive 107, e.g., a diagnostics floppy disk (not shown) also containing diagnostic routines. As shown in FIG. 6, using an installation routine, called LOAD_ENABLERS, the CPU 100 loads 500 the enablers from the floppy disk and stores 502 the enablers 202 in the diagnostics partition 201 of the disk drive 114.

Figure 5:
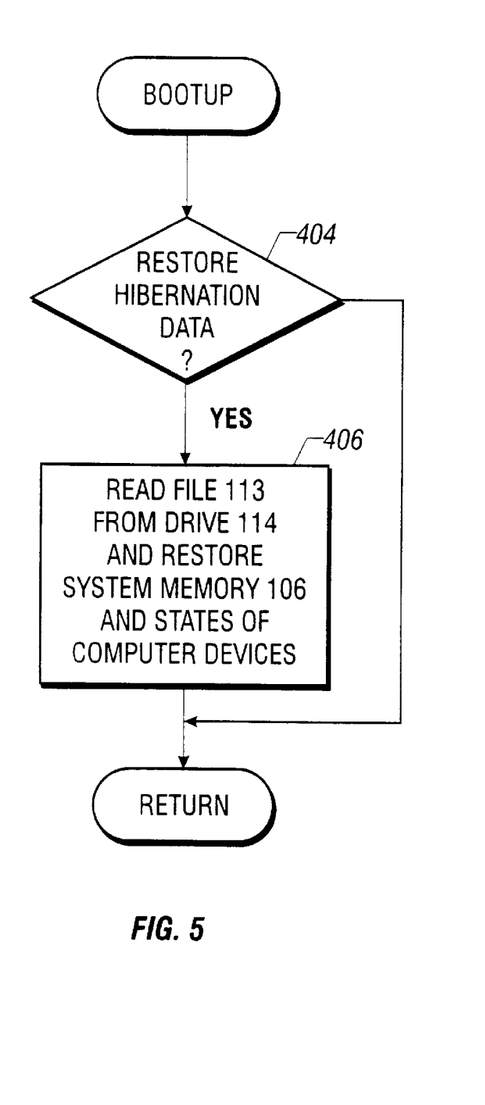
FIG. 5 is a flow diagram illustrating a routine to restore hibernation data.

The file enablers 202 also enable the hibernation routine 111 to restore the state of the computer system 10 in existence prior to hibernation, i.e., the hibernation data, by reading the hibernation data file 113 from the disk drive 114. Following hibernation, when either AC power is subsequently available, the battery pack 120 has been charged by the computer system 10, or another battery pack 120 that has been charged is inserted into the computer system 10, the power supply 118 asserts the signal PWRGOOD. The integrated system management circuit 116 then notifies the CPU 100. In a routine called BOOTUP (FIG. 5) executed at bootup of the computer system 10, the CPU 100 determines 404 if the system 10 has been in hibernation. If so, the CPU 100 reads 406 the hibernation data file 113 from the disk drive 114 and restores 406 the contents of system memory 106 and the states of the computer devices.

Figure 4:
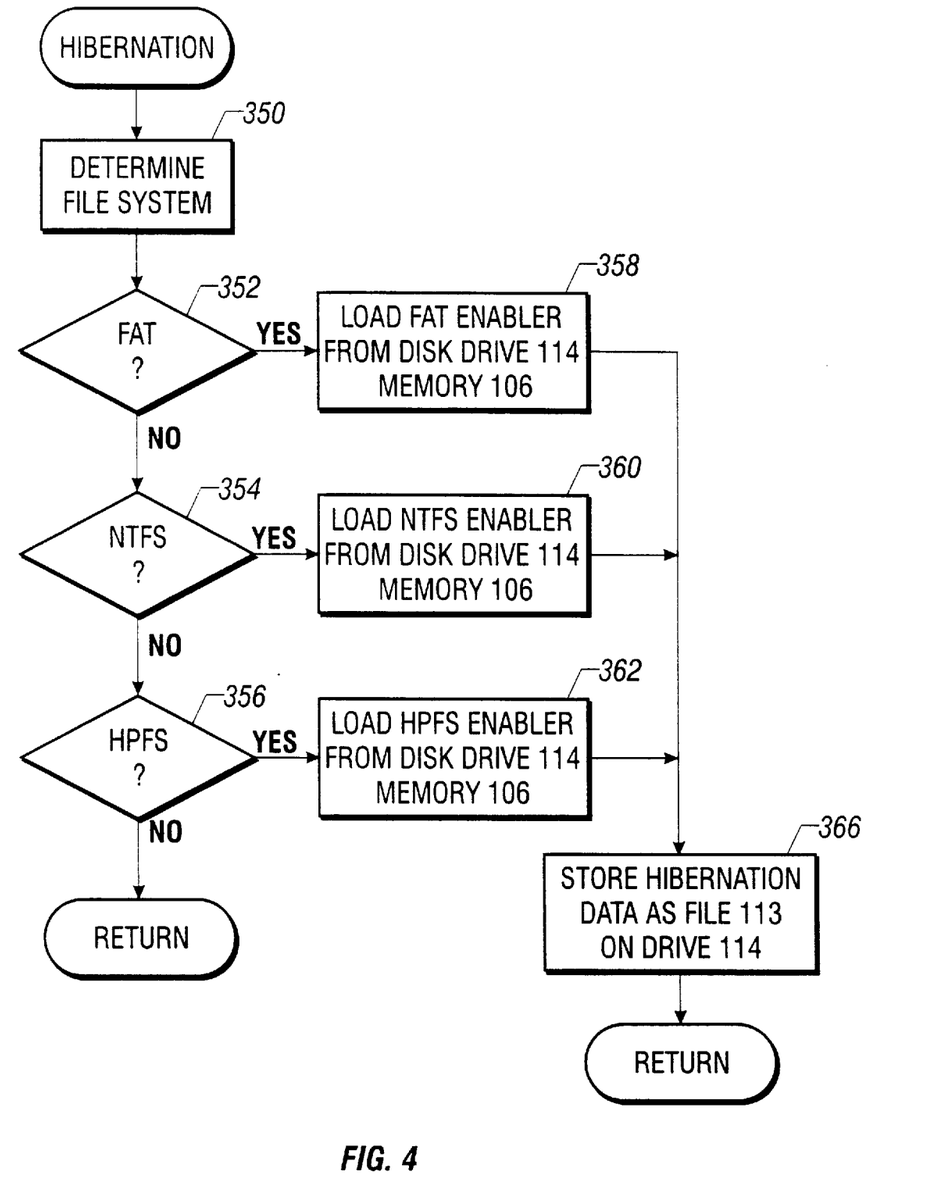
FIG. 4 is a flow diagram illustrating a hibernation routine.

Other embodiments are within the scope of the following claims. For example, as shown in FIG. 4, the file enablers 202 may be loaded from the partition 201 to the system memory area 109 by a hibernation routine called HIBERNATION when hibernation is to be invoked. The CPU 100 determines 350–356 the file system that is installed and being used. The CPU then loads 358–362 the corresponding file system enabler 202. If the file system is unrecognized, the CPU 100 terminates the HIBERNATION routine. Otherwise, the CPU 100 then stores 366 the hibernation data file 113 on the disk drive 114.

What is claimed is:

1. A method for aiding the execution of a firmware routine in a computer system, comprising:

retrieving the firmware routine from a firmware memory:

loading a file enabler stored on a mass storage device, the file enabler being associated with a file system for enabling file operations;

storing the file enabler in another memory; and allowing the firmware routine to access the file enabler stored in said another memory when the firmware routine performs file operations.

2. The method of claim 1 wherein the file operations include accessing files on the mass storage device.

3. The method of claim 1 wherein the firmware routine copies hibernation data from said another memory to the mass storage device using the file enabler.

4. The method of claim 1 wherein the firmware routine copies hibernation data from the mass storage device to said another memory using the file enabler.

5. The method of claim 1 wherein the mass storage device comprises a disk drive.

6. The method of claim 1 further comprising storing at least two file enablers on the mass storage device, the file enablers being associated respectively with different file systems for enabling file operations on the mass storage device.

7. The method of claim 6 further comprising identifying a file system used by the computer system to access files on the mass storage device.

8. The method of claim 7 wherein the used file system comprises a FAT file system.

9. The method of claim 7 wherein the used file system comprises a NTFS file system.

10. The method of claim 7 wherein the used file system comprises a HPFS file system.

11. The method of claim 1 wherein the firmware routine does not have access to operating system code stored in said another memory.

12. A method for aiding the use of a firmware routine in a computer system having a mass storage device which stores files in accordance with any of a number of file systems, comprising:

retrieving the firmware routine from a firmware memory;

determining, among the number of file systems, the file system according to which the files are being stored; and allowing the firmware routine to perform a file operation on the mass storage device in accordance with the file system under which the files are being stored.

13. The method of claim 12 wherein the firmware routine does not have access to an operating system code stored in another memory.

14. The method of claim 12 wherein the allowing includes:

loading a file enabler from the mass storage device into another memory of the computer system, the file enabler being associated with the file system according to which the files are stored for enabling file operations.

15. The method of claim 14 wherein the file enabler is stored in a partition on the mass storage device separate from a partition in which the files are stored.

16. The method of claim 15 wherein the partition comprises a preexisting diagnostics partition.

17. The method of claim 12 wherein the allowing includes:

storing file enablers associated with the file systems on the mass storage device.

18. The method of claim 12 wherein the file operation is performed on hibernation data.

19. The method of claim 12 wherein the mass storage device is a disk drive.

20. A computer system comprising:

a mass storage device storing a file enabler associated with a file system for enabling file operations;

a firmware memory storing a firmware routine;

a second memory; and a microprocessor connected to load the file enabler stored on the mass storage device into the second memory; and allow the firmware routine to access the file enabler stored in the second memory when the firmware routine performs the file operations.

21. The computer system of claim 20 wherein the file operations include accessing files on the mass storage device.

22. The computer system of claim 20 wherein the firmware routine copies hibernation data from the memory to a mass storage device using the file enabler.

23. The computer system of claim 20 wherein the firmware routine copies hibernation data from a mass storage device to the memory using the file enabler.

24. The computer system of claim 20 wherein the mass storage device comprises a disk drive.

25. The computer system of claim 20 wherein the microprocessor is further connected to store at least two file enablers on a mass storage device, the file enablers being associated respectively with different file systems for enabling file operations on the mass storage device.

26. The computer system of claim 25 wherein the microprocessor is further connected to identify a file system used by the computer system to access files on the mass storage device.

27. The computer system of claim 26 wherein the used file system comprises a FAT file system.

28. The computer system of claim 26 wherein the used file system comprises a NTFS file system.

29. The computer system of claim 26 wherein the used file system comprises a HPFS file system.

30. The computer system of claim 20 wherein the firmware routine does not have access to operating system code stored in said second memory.

31. The computer system of claim 26 wherein the file operations include accessing files on the mass storage device.

32. A computer system comprising:

a mass storage device which stores files in accordance with any of a number of file systems;

a firmware memory storing a firmware routine; and a microprocessor connected to determine, among the number of file systems, the file system according to which the files are being stored; and allow the firmware routine to perform a file operation on the mass storage device in accordance with the file system under which the files are being stored.

33. The computer system of claim 32 wherein the firmware routine does not have access to operating system code stored in another memory.

34. The computer system of claim 32 wherein the allowing includes:

loading a file enabler from the mass storage device into a memory of the computer system, the file enabler being associated with the file system according to which the files are stored for enabling file operations.

35. The computer system of claim 34 wherein the file enabler is stored in a partition on the mass storage device separate from a partition in which the files are stored.

36. The computer system of claim 35 wherein the partition in which the file enabler is stored comprises a preexisting diagnostics partition.

37. The computer system of claim 32 wherein the microprocessor allows the file operation to perform by:

storing file enablers associated with the file systems on the mass storage device.

38. The computer system of claim 32 wherein the file operation is performed on hibernation data.

39. The computer system of claim 32 wherein the mass storage device is a disk drive.

40. A method for aiding the execution of a hibernation routine in a computer system, comprising:

loading a file enabler stored on a mass storage device, the file enabler being associated with a file system for enabling file operations;

storing the file enabler in another memory; and allowing the hibernation routine to access the file enabler stored in said another memory when the hibernation routine performs file operations.

41. The method of claim 40, wherein the hibernation routine copies hibernation data from said another memory to the mass storage device using the file enabler.

42. The method of claim 40, wherein the hibernation routine copies hibernation data from the mass storage device to the said another memory using the file enabler.

43. The method of claim 40, further comprising:

storing at least two file enablers on the mass storage device, the file enablers being associated respectively with different file systems for enabling file operations on the mass storage device.

44. A computer system comprising:

a mass storage device storing a file enabler associated with a file system for enabling file operations;

a firmware memory storing a hibernation routine;

a second memory; and a microprocessor connected to load the file enabler stored on the mass storage device into the second memory; and allow the hibernation routine to access the file enabler stored in the second memory when the hibernation routine performs the file operations.

45. The computer system of claim 44, wherein the hibernation routine copies hibernation data from the memory to a mass storage device using the file enabler.

46. The computer system of claim 44, wherein the hibernation routine copies hibernation data from a mass storage device to the memory using the file enabler.

47. The computer system of claim 44, wherein the microprocessor is further connected to store at least one additional file enabler on the mass storage device, the file enablers being associated respectively with different file systems for enabling file operations on the mass storage device.

48. The computer system of claim 20, wherein the microprocessor is further connected to store at least two file enablers on a mass storage device, the file enablers being associated respectively with different file systems for enabling file operations on the mass storage device.

49. A computer system comprising:

a mass storage device which stores files in accordance with any of a number of file systems;

a firmware memory storing a hibernation routine; and a microprocessor connected to determine, among the number of file systems, the file system according to which the files are being stored; and allow the hibernation routine to perform a file operation on the mass storage device in accordance with the file system under which the files are being stored.

* * * * *